(12) United States Patent
Huynh et al.

(10) Patent No.: US 10,150,177 B2
(45) Date of Patent: Dec. 11, 2018

(54) ROTARY CHANGER

(71) Applicant: TIPMAN CO., LTD., Miyoshi-shi, Aichi (JP)

(72) Inventors: Thinh Huu Huynh, Aichi (JP); Anura Silva Marakkala Manage, Aichi (JP)

(73) Assignee: TIPMAN CO., LTD., Miyoshi-Shi (JP)

( * ) Notice: Subject to any disclaimer, the term of this patent is extended or adjusted under 35 U.S.C. 154(b) by 81 days.

(21) Appl. No.: 15/608,922

(22) Filed: May 30, 2017

(65) Prior Publication Data
US 2017/0291250 A1 Oct. 12, 2017

Related U.S. Application Data

(63) Continuation of application No. PCT/JP2016/084855, filed on Nov. 24, 2016.

(30) Foreign Application Priority Data

Apr. 11, 2016 (JP) .................. 2016-079019

(51) Int. Cl.
*B23K 11/30* (2006.01)
*B23Q 3/155* (2006.01)

(52) U.S. Cl.
CPC ....... *B23K 11/3072* (2013.01); *B23K 11/3063* (2013.01); *B23Q 3/15506* (2013.01); *Y10T 483/17* (2015.01); *Y10T 483/1882* (2015.01)

(58) Field of Classification Search
CPC ............ Y10T 483/17; Y10T 483/1882; B23K 11/3072; B23K 11/3063; B23Q 3/155–3/15793
See application file for complete search history.

(56) References Cited

U.S. PATENT DOCUMENTS 4,645,901 A * 2/1987 Scholz .................. B23K 9/323
219/125.1
5,734,141 A * 3/1998 Voilmy .............. B23K 11/3072
219/86.25

(Continued)

FOREIGN PATENT DOCUMENTS

JP H6-254680 A 9/1994
JP H11-239876 A 2/1998
(Continued)

OTHER PUBLICATIONS

KR Office Action in application No. 10-2017-7014923 dated Jul. 31, 2018.

(Continued)

*Primary Examiner* — Sunil K Singh
*Assistant Examiner* — Yasir Diab
(74) *Attorney, Agent, or Firm* — Maschoff Brennan

(57) ABSTRACT

A moving mechanism brings the rotational axis of each driven rotator into alignment with the rotational axis of a drive rotator, which has an engaging face extending along its rotational axis. Each driven rotator has an engageable face extending along the rotational axis of the drive rotator. Rotating the drive rotator while moving the driven rotator, of which the rotational axis is aligned with the rotational axis, toward the drive rotator will bring the engaging face into engagement with the engageable face.

6 Claims, 13 Drawing Sheets

(56) References Cited

U.S. PATENT DOCUMENTS

| | | | | |
|---|---|---|---|---|
| 8,574,140 B2* | 11/2013 | Erlenmaier | ........ | B23K 26/1482 |
| | | | | 483/16 |
| 2005/0023250 A1* | 2/2005 | Izumi | ................. | B23K 11/3072 |
| | | | | 219/86.8 |
| 2009/0101628 A1* | 4/2009 | Kaeseler | ............ | B23K 11/3072 |
| | | | | 219/86.8 |
| 2012/0125903 A1* | 5/2012 | Izutani | ................... | B23K 9/173 |
| | | | | 219/136 |
| 2013/0008003 A1* | 1/2013 | Izutani | ..................... | B23K 9/26 |
| | | | | 29/402.08 |
| 2014/0291299 A1* | 10/2014 | Ishikawa | ............ | B23K 11/3072 |
| | | | | 219/86.8 |
| 2015/0298246 A1* | 10/2015 | Nakajima | ............. | B23K 11/115 |
| | | | | 219/86.8 |
| 2017/0072500 A1* | 3/2017 | Marakkala Manage | ..................... | |
| | | | | B23K 9/26 |

FOREIGN PATENT DOCUMENTS

| | | | |
|---|---|---|---|
| JP | H11-347731 A | | 5/1999 |
| JP | 2002-192345 A | | 7/2002 |
| JP | 2012130928 A | * | 7/2012 |
| KR | 19990012437 U | | 4/1999 |

OTHER PUBLICATIONS

European Search Report dated Apr. 26, 2018 in application No. 16861082.2.

* cited by examiner

ROTARY CHANGER

CROSS-REFERENCE TO RELATED APPLICATION

This is a continuation of International Application No. PCT/JP2016/084855 filed on Nov. 24, 2016, which claims priority to Japanese Patent Application No. 2016-079019 filed on Apr. 11, 2016. The entire disclosures of these applications are hereby incorporated by reference.

BACKGROUND

The present disclosure relates to a rotary changer configured to replace a contact tip screwed on, and coupled to, a tip end of a torch body of a welding torch for use in arc welding.

A rotary changer for attaching or removing a contact tip to/from a tip end of a torch body of a welding torch for use in arc welding has been generally known in the pertinent art. For example, the rotary changer disclosed in Japanese Unexamined Patent Publication No. 2002-192345 includes a plurality of rotators for turning a contact tip on their center axis in order to perform such contact tip replacement work efficiently. Those rotators are horizontally arranged side by side in a rectangular parallelepiped housing holder such that their rotational axes are oriented vertically. A spur gear, of which the rotational axis is aligned with that of one of those rotators, is attached to the bottom of the rotator. A single drive motor with a vertically extending drive shaft is arranged under the housing holder, and a pinion gear facing inward under the housing holder is attached to the drive shaft. The housing holder is horizontally movable with a rack and pinion mechanism. Horizontally moving the housing holder transfers those rotators one after another to a tip replacement position where the contact tip is replaced with respect to the welding torch, and also allows the pinion gear to mesh with the spur gear of the rotator that has moved to reach the tip replacement position. This facilitates a change of the rotators at the tip replacement position where the contact tip is to be replaced, and also connects the rotator located at the tip replacement position to a driving part that turns the rotator, thereby rotating the rotator at the tip replacement position.

According to Japanese Unexamined Patent Publication No. 2002-192345, the spur gear of each of those rotators is allowed to mesh with the pinion gear attached to the drive shaft of the drive motor while being moved perpendicularly to its rotational axis. Therefore, repeated changes of the rotators at the tip replacement position would put a heavy load on the respective teeth of the spur and pinion gears in the tooth thickness direction every time the spur gear meshes with the pinion gear, thus eventually leading to deformation or damage of the spur and pinion gears.

The present disclosure provides a mechanism for substantially preventing, in a rotary changer including a plurality of rotators performing the contact tip replacement work and configured to rotate those rotators with a single drive source, a portion connecting each of those rotators to the drive source that drives the rotator from being deformed or damaged.

SUMMARY

According to the present disclosure, each rotator performing the contact tip replacement work is connected to the drive source by being moved along its rotational axis.

Specifically, the present disclosure is directed to a rotary changer configured to attach or remove a contact tip to/from a tip end of a torch body of a welding torch by turning the contact tip on its center axis, and provides the following solution.

A first aspect of the present disclosure is a rotary changer including: a first rotator to be driven in rotation on a first rotational axis; a plurality of second rotators provided to be rotatable on a second rotational axis that extends in the same direction as the first rotational axis and arranged side by side perpendicularly to the second rotational axis in order to turn the contact tip with the center axis of the contact tip aligned with the second rotational axis; a moving mechanism configured to move one of the second rotators after another to sequentially bring the second rotational axis of each of the second rotators into alignment with the first rotational axis at a position in one of two directions along the rotational axis of the first rotator; and a first spring member configured to bias the first rotator in the one direction along the rotational axis of the first rotator. The first rotator has an engaging projection with an engaging face extending along the rotational axis of the first rotator. Each of the second rotators has an engageable projection with an engageable face extending along the rotational axis of the second rotator. Rotating the first rotator with the second rotator, of which the second rotational axis is aligned with the first rotational axis, moved toward the first rotator brings the engaging face into engagement with the engageable face.

A second aspect of the present disclosure is an embodiment of the first aspect of the present disclosure. In the second aspect, the rotary changer further includes a second spring member configured to bias the second rotator in a direction away from the first rotator along the rotational axis of the second rotator.

A third aspect of the present disclosure is an embodiment of the first or second aspect of the present disclosure. In the third aspect, the engaging face covers a protruding end through a base end of the engaging projection, and a protruding end facet of the engaging projection spirally runs with tilt from an edge portion of the engaging face, which is located closer to the protruding end of the engaging projection, in a reverse rotation direction of the first rotator.

A fourth aspect of the present disclosure is an embodiment of any one of the first to third aspects of the present disclosure. In the fourth aspect, the moving mechanism includes: a third rotator which is provided to be rotatable on a third rotational axis that extends parallel to the first rotational axis and on which the second rotators are arranged side by side at regular intervals in a rotation direction around the third rotational axis; and a third spring member configured to bias the third rotator in a normal rotation direction of the third rotator. The third rotator has, at an outer peripheral edge thereof, a plurality of projections that are arranged at regular intervals in the rotation direction around the third rotational axis so as to face either the respective second rotators or gaps between the respective second rotators. A sliding member which is slidable along the rotational axis of the first rotator is provided radially outside the third rotator. The sliding member includes a first wall portion and a second wall portion. When the sliding member is allowed to slide in the one direction along the rotational axis of the first rotator, the first wall portion blocks passage of the respective projections during the normal direction rotation of the third rotator and bring the second rotational axis of the second rotator that is replacing the contact tip into alignment with the first rotational axis. On the other hand, when the sliding member is allowed to slide in the other direction along the rotational axis of the first rotator, the first wall portion clears a passage for the respective projections during the normal direction rotation of the third rotator. The second wall portion is provided downstream of the first wall portion in the normal rotation direction of the third rotator and located away from the first wall portion at a distance shorter than the interval between the respective projections. When the sliding member is allowed to slide in the one direction along the rotational axis of the first rotator, the second wall portion clears a passage for the respective projections during the normal direction rotation of the third rotator. On the other hand, when the sliding member is allowed to slide in the other direction along the rotational axis of the first rotator, the second wall portion blocks the passage of the respective projections during the normal direction rotation of the third rotator.

A fifth aspect of the present disclosure is an embodiment of the fourth aspect of the present disclosure. In the fifth aspect, the rotary changer further includes a fourth spring member configured to bias the sliding member in the one direction along the rotational axis of the first rotator.

According to the first aspect of the present disclosure, moving one of the second rotators, of which the second rotational axis is aligned with the first rotational axis, toward the first rotator using the moving mechanism will bring the second rotator into contact with the first rotator. At this time, the impact produced when the second rotator comes into contact with the first rotator is absorbed by the contraction of the first spring member, thus substantially preventing the first and second rotators from being damaged or deformed. As the first rotator is driven in rotation with the first and second rotators kept in contact with each other, the first rotator rotates while making a sliding contact with the second rotator, and then starts rotating integrally with the second rotator with the engaging face of the engaging projection brought into engagement with the engageable face of the engageable projection. This allows the contact tip to turn on its center axis to get ready to start the contact tip replacement work. Moving the second rotator in the direction away from the first rotator upon the completion of the contact tip replacement work will bring the engaging and engageable projections out of engagement with each other while allowing the engaging and engageable faces to make a sliding contact with each other. Thus, no load is imposed on any of the first and second rotators that are going out of contact with each other. As can be seen, no heavy load imposed on the engaging or engageable projection when the first and second rotators are being connected to each other or when the first and second rotators are being disconnected from each other will cause substantially no deformation or damage around the rotator performing the contact tip replacement work.

According to the second aspect of the present disclosure, after having done the contact tip replacement work, the second rotator automatically goes back to its original position under the biasing force of the second spring member. This enhances the work efficiency of the contact tip replacement without entailing the cost.

According to the third aspect of the present disclosure, while the first rotator is rotating during the contact tip replacement work, the engageable projection moves spirally while making a sliding contact with the protruding end facet of the engaging projection. Thereafter, the engaging face of the engaging projection is engaged with the engageable face of the engageable projection. This reduces the variation in frictional resistance produced between the first and second rotators before the engaging projection and the engageable projection are engaged with each other, thus allowing the first rotator to be smoothly connected to the second rotator.

According to the fourth aspect of the present disclosure, while the sliding member is allowed to slide in one of the two directions along the rotational axis of the first rotator, one of the projections comes into contact with the first wall portion to stop the rotation of the third rotator. This brings the second rotational axis of the second rotator, performing the contact tip replacement work, into alignment with the first rotational axis of the first rotator. Allowing the sliding member to slide in the other of the two directions along the rotational axis of the first rotator in such a state will bring the projection that has been in contact with the first wall portion out of contact with the first wall portion, which triggers the rotation of the third rotator under the biasing force of the third spring member. Meanwhile, the projection that has gone out of contact with the first wall portion will come into contact with the second wall portion when it has moved a shorter distance than the interval between the projections, which will bring the rotation of the third rotator to a halt. After that, allowing the sliding member to slide in the one direction along the rotational axis of the first rotator will bring the projection that has been in contact with the second wall portion out of contact with the second wall portion, thus allowing the third rotator to start rotating under the biasing force of the third spring member. Meanwhile, another projection adjacent to the projection that has gone out of contact with the second wall portion will come into contact with the first wall portion, which brings the rotation of the third rotator to a halt again. This brings the second rotational axis of another second rotator, adjacent to the second rotator that has performed the contact tip replacement work, into alignment with the first rotational axis of the first rotator. In this manner, the respective second rotators that perform the contact tip replacement work are changeable with the biasing force of the third spring member and the reciprocation of the sliding member. Thus, this rotary changer can have a simpler configuration, and be less expensive, than a changer requiring a power supply or an air supply source.

According to the fifth aspect of the present disclosure, stopping pressing the sliding member after having pressed it in the other of the two directions along the rotational axis of the first rotator will allow the sliding member to automatically slide in the one direction along the rotational axis of the first rotator under the biasing force of the fourth spring member. Thus, a change of respective second rotators is done just by pressing the sliding member in the other direction along the rotational axis of the first rotator. Consequently, the second rotators are changeable efficiently without entailing additional costs.

DETAILED DESCRIPTION

Embodiments of the present disclosure will now be described in detail with reference to the accompanying drawings. Note that the following description of embodiments is only an example in nature and is not intended to limit the scope, application, or uses of the present disclosure.

<<First Embodiment of the Present Disclosure>>

Figure 1:
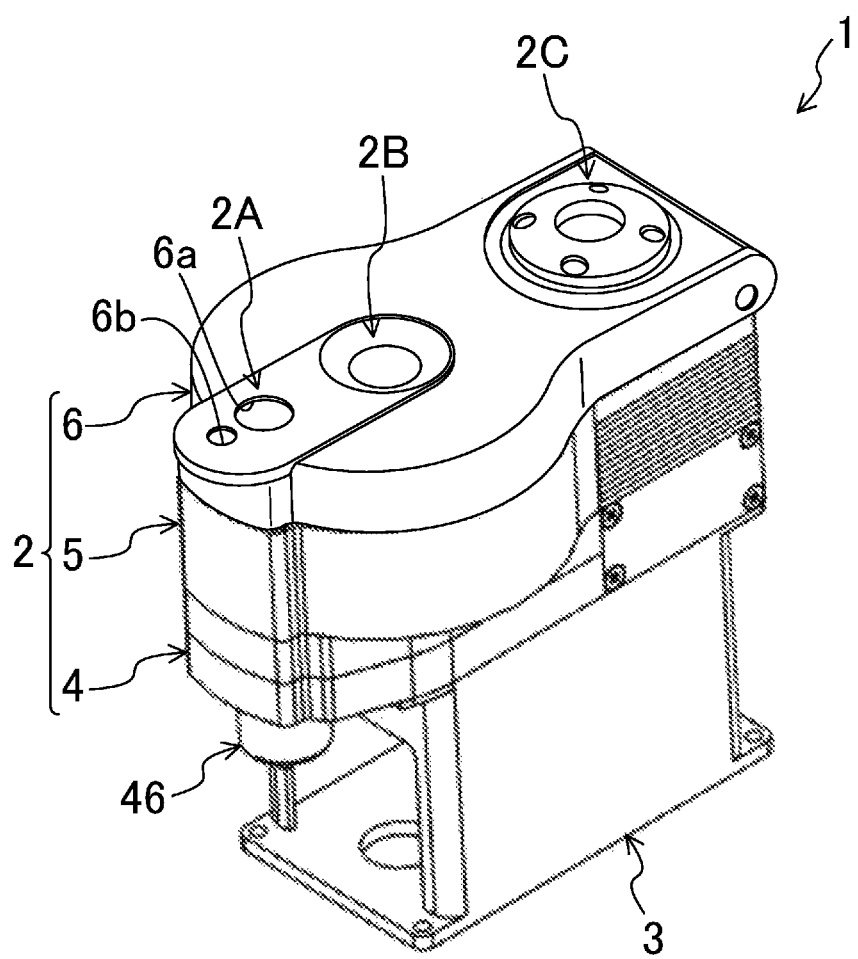
FIG. 1 is a perspective view of a rotary changer according to a first embodiment of the present disclosure.

FIG. 1 illustrates a rotary changer 1 according to a first embodiment of the present disclosure. This rotary changer 1 is used to automatically replace a metallic nozzle 11 or contact tip 12, which is an exemplary torch component of a welding torch 10 for use to weld a steel plate, for example, by arc welding.

Figure 3:
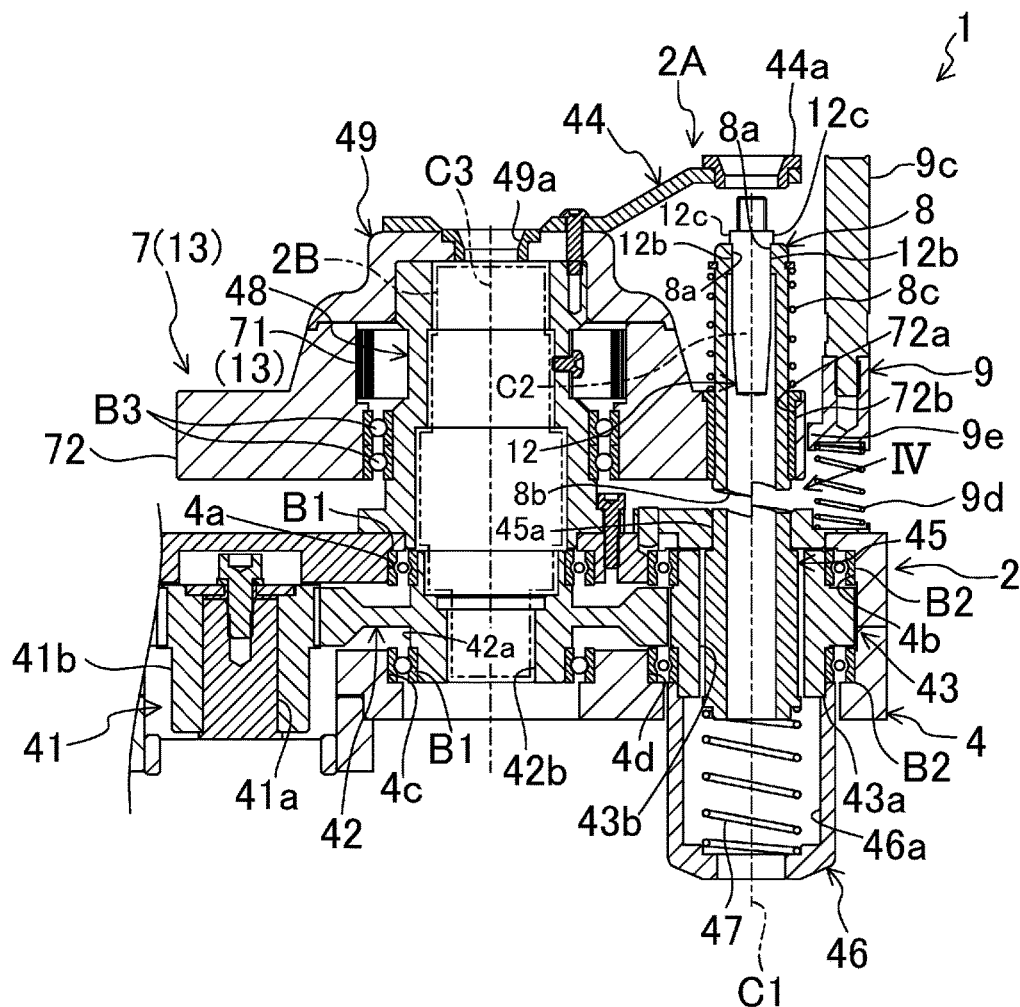
FIG. 3 is a cross-sectional view taken along the plane III-III shown in FIG. 2.
Figure 5:
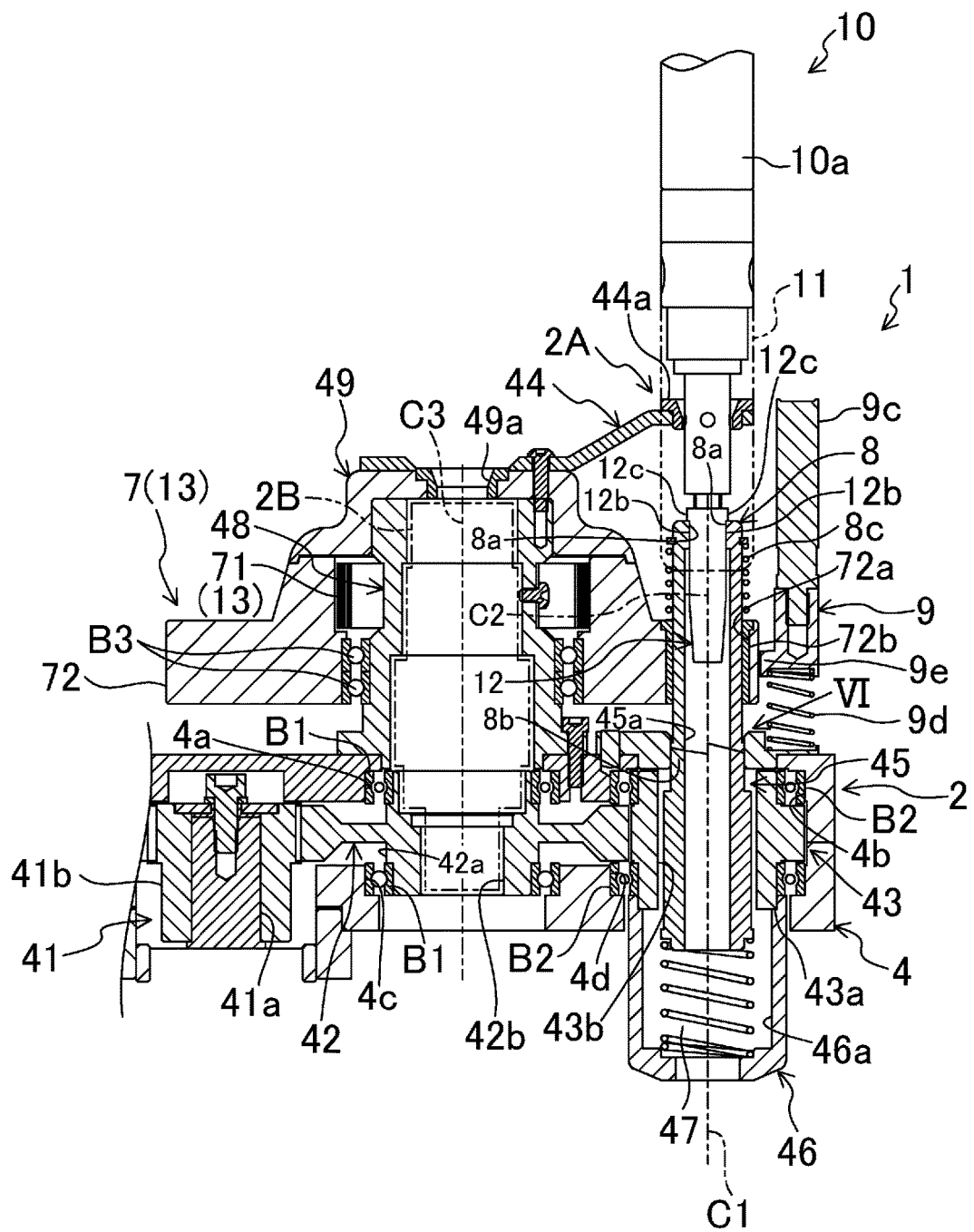
FIG. 5 is a view illustrating a state where a contact tip is being attached to the tip end of a torch body after the state shown in FIG. 3.

As shown in FIGS. 3 and 5, the welding torch 10 includes a circular columnar torch body 10a, and the nozzle 11 having a cylindrical shape is screwed on, and coupled to, a tip end of the torch body 10a so as to be readily attachable to, and removable from, the tip end of the torch body 10a.

The contact tip 12 of copper in a fine rod shape is screwed on, and coupled to, the tip end of the torch body 10a. The tip end portion of the contact tip 12 sticks out of the opening at the tip end of the nozzle 11.

A portion of the contact tip 12 covering a middle through the tip end of its outer peripheral surface has a tapered shape, of which the diameter gradually decreases toward the tip end of the contact tip 12. The outer peripheral surface of the contact tip 12 also has two flat surfaces 12b which are symmetric and parallel to each other with respect to the center axis thereof and which are located closer to the base end.

Each of the flat surfaces 12b is formed by cutting off the outer peripheral surface of the contact tip 12. Thus, a portion of the contact tip 12, closer to the base end thereof than each flat surface 12b is, serves as a projecting portion 12c projecting laterally outward.

Figure 2:
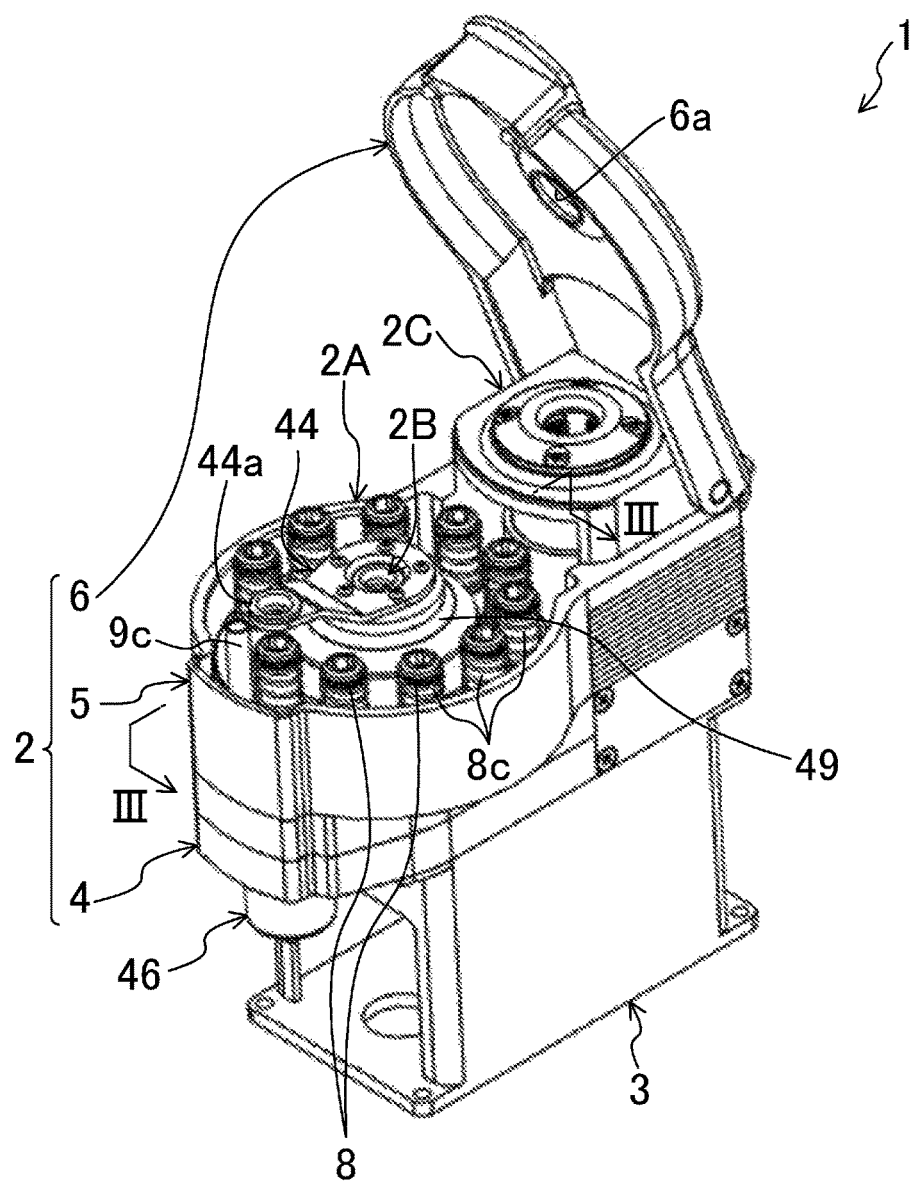
FIG. 2 is a perspective view illustrating the appearance of the rotary changer according to the first embodiment of the present disclosure when its opening/closing cover is opened.

As shown in FIGS. 1 and 2, the rotary changer 1 includes a changer body 2 having a generally keyhole shape in a plan view, and a pedestal 3 supporting the changer body 2. The changer body 2 includes a contact tip attaching mechanism 2A for attaching the contact tip 12 onto the torch body 10a, a contact tip removing mechanism 2B for removing the contact tip 12 from the torch body 10a, and a nozzle attaching/removing mechanism 2C for attaching and removing the nozzle 11 to/from the torch body 10a.

In the following description of the first embodiment, detailed description of the contact tip removing mechanism 2B and nozzle attaching/removing mechanism 2C will be omitted herein.

The changer body 2 is comprised of a gearbox 4 in a rectangular parallelepiped shape, a cover case 5 extending along the upper peripheral edge of the gearbox 4 and covering the space over the gearbox 4, and an opening/closing cover 6 covering the upper opening of the cover case 5 in an openable and closable state.

As shown in FIGS. 3 and 5, a servomotor 41 running under servo control is mounted onto the center of the lower surface of the gearbox 4.

An output shaft 41a of the servomotor 41 extends vertically and faces the inner space of the gearbox 4. A pinion gear 41b is attached to the upper end portion of the output shaft 41a.

The upper surface of the gearbox 4 has a first upper through hole 4a and a second upper through hole 4b, which both have a circular cross section and are arranged in this order from a center portion of the gearbox 4 toward one end thereof in the longitudinal direction. On the other hand, the lower surface of the gearbox 4 has a first lower through hole 4c and a second lower through hole 4d, which both have a circular cross section and face the first and second upper through holes 4a and 4b, respectively.

A generally disklike first gear 42 is arranged between the first upper through hole 4a and the first lower through hole 4c.

The first gear 42 has a vertically projecting, dilated first pivot 42a at its center. The first pivot 42a has a first center hole 42b vertically penetrating the first pivot 42a through the center portion thereof.

The first gear 42 is rotatable on a vertically oriented rotational axis C3 (serving as an exemplary third rotational axis) via a bearing B1 interposed between the top end portion of the first pivot 42a and the first upper through hole 4a and another bearing B1 interposed between the bottom end portion of the first pivot 42a and the first lower through hole 4c.

Also, the first gear 42 meshes with the pinion gear 41b, and is configured to rotate on the rotational axis C3 as the output shaft 41a of the servomotor 41 turns.

A generally disklike second gear 43 is arranged between the second upper through hole 4b and the second lower through hole 4d.

The second gear 43 has a vertically projecting, dilated second pivot 43a at its center. The second pivot 43a has a second center hole 43b vertically penetrating the second pivot 43a through the center portion thereof.

The second gear 43 is rotatable on a rotational axis C1 (serving as an exemplary first rotational axis), oriented in the same direction as the rotational axis C3, via a bearing B2 interposed between the top end portion of the second pivot 43a and the second upper through hole 4b and another bearing B2 interposed between the bottom end portion of the second pivot 43a and the second lower through hole 4d.

Also, the second gear 43 meshes with the first gear 42, and is configured to rotate on the rotational axis C1 as the rotation of the output shaft 41a of the servomotor 41 triggers the rotation of the first gear 42.

A cylindrical drive rotator 45 (serving as an exemplary first rotator), of which the center of cylinder is aligned with the rotational axis C1, is inserted into the second center hole 43b so as to be slidable along its rotational axis. The drive rotator 45 is configured to rotate, along with the second gear 43, on the rotational axis C1 via a key groove (not shown).

Figure 4:
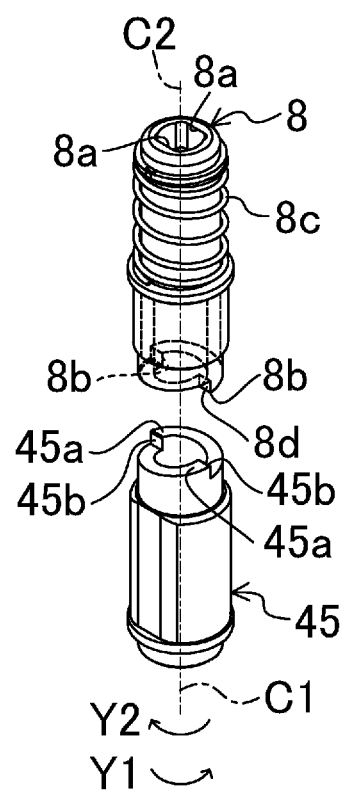
FIG. 4 is a view as viewed in the direction indicated by the arrow IV in FIG. 3.
Figure 6:
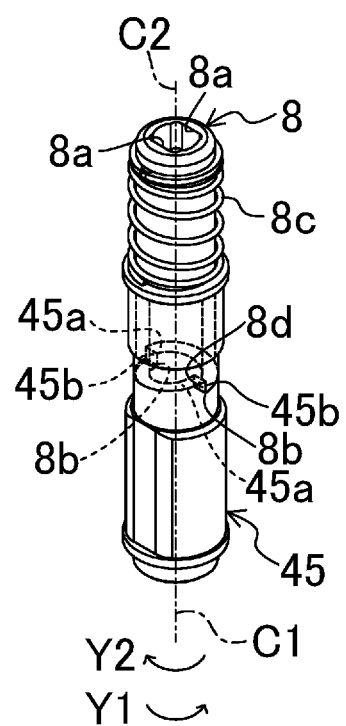
FIG. 6 is a view as viewed in the direction indicated by the arrow VI in FIG. 5.

That is to say, the servomotor 41 is configured to drive the drive rotator 45 in rotation in the normal rotation direction (i.e., in the direction Y1) via the pinion gear 41*b* and the first and second gears 42 and 43 as shown in FIGS. 4 and 6.

At the top end of the drive rotator 45, a pair of upwardly protruding engaging projections 45*a* are arranged symmetrically to each other with respect to the rotational axis C1.

Each of the engaging projections 45*a* has an engaging face 45*b* extending along the rotational axis of the drive rotator 45. Each of the engaging faces 45*b* covers the protruding end through base end of an associated one of the engaging projections 45*a*.

The protruding end facet of one engaging projection 45*a* spirally runs with tilt from an edge portion of the engaging face 45*b*, which is located closer to the protruding end of the engaging projection 45*a*, in the reverse rotation direction of the drive rotator 45 (i.e., in the direction Y2), and is connected to an edge portion of the engaging face 45*b* at the base end of the other engaging projection 45*a*.

The protruding end facet of the other engaging projection 45*a* spirally runs with tilt from an edge portion of the engaging face 45*b*, which is located closer to the protruding end of the engaging projection 45*a*, in the reverse rotation direction of the drive rotator 45 (i.e., in the direction Y2), and is connected to an edge portion of the engaging face 45*b* at the base end of the one engaging projection 45*a*.

Under the second gear 43, arranged is a cover member 46 with an upwardly opening housing recess 46*a* as shown in FIGS. 3 and 5. The housing recess 46*a* houses a first coil spring 47 (serving as an exemplary first spring member).

The peripheral edge of the top of the cover member 46 is secured to the lower surface of the second pivot 43*a* such that the cover member 46 can rotate integrally with the second gear 43.

One end of the first coil spring 47 abuts on the lower surface of the drive rotator 45, while the other end of the first coil spring 47 abuts on the bottom surface of the housing recess 46*a*. The first coil spring 47 biases the drive rotator 45 upward (i.e., in the one direction along the rotational axis of the drive rotator 45).

A cylindrical shaft case 48 extending upward from the peripheral edge portion of the first upper through hole 4*a* is secured to the upper surface of the first gear 42. The contact tip removing mechanism 2B is provided inside the shaft case 48.

A ringlike rotary unit 7 (serving as an exemplary third rotator) is externally fitted onto the shaft case 48.

The rotary unit 7 is rotatable on the rotational axis C3 via two bearings B3 interposed between the lower half of the inner peripheral surface of the rotary unit 7 and the shaft case 48.

A power spring 71 (serving as an exemplary third spring member) is arranged between the upper half of the inner peripheral surface of the rotary unit 7 and the shaft case 48. The power spring 71 biases the rotary unit 7 in the normal rotation direction (i.e., in the direction X1, see FIG. 7) around the rotational axis C3.

The lower half of the rotary unit 7 has an annular projecting portion 72, which protrudes laterally outward and which extends in the direction in which the rotary unit 7 rotates.

Through the annular projecting portion 72, ten vertically penetrating fitting holes 72*a* are cut and arranged side by side in the direction in which the rotary unit 7 rotates (i.e., the direction perpendicular to the rotational axis C1). These fitting holes 72*a* are arranged at regular intervals except between the two fitting holes 72*a* respectively located most upstream and most downstream in the normal rotation direction of the rotary unit 7.

A cylindrical bush 72*b* is fitted into each fitting hole 72*a*. Into each bush 72*b*, a driven rotator 8 (serving as an exemplary second rotator), of which the rotational axis C2 (serving as an exemplary second rotational axis) is oriented in the same direction as the rotational axis C1, is inserted and fitted so as to be rotatable on the rotational axis C2.

The driven rotator 8 is slidable along its own rotational axis, and is arranged over the drive rotator 45 (i.e., at a position in one of two directions along the rotational axis of the drive rotator 45).

On the outer peripheral edge of the annular projecting portion 72, arranged at regular intervals are as many first projections 73 as the driven rotators 8.

One of the first projections 73 is arranged on the outer peripheral edge of the annular projecting portion 72 so as to be located further downstream of the fitting hole 72*a* that is located most downstream in the normal rotation direction of the rotary unit 7. Each of the other first projections 73 is arranged at an intermediate position between an associated pair of the driven rotators 8.

A second projection 74 is arranged on the outer peripheral edge of the annular projecting portion 72 so as to be located further upstream of the fitting hole 72*a* that is located most upstream in the normal rotation direction of the rotary unit 7. The protrusion height of the second projection 74 is greater than that of the first projections 73.

The power spring 71 and the respective driven rotators 8 form the moving mechanism 13 according to the present disclosure. The moving mechanism 13 moves the respective driven rotators 8 by rotating the rotary unit 7, thereby sequentially bringing the rotational axis C2 of each of the driven rotators 8 into alignment with the rotational axis C1 of the drive rotator 45 one after another.

The inner peripheral surface of an upper portion of each of the driven rotators 8 has a pair of hooks 8*a*, which protrude toward, and are arranged symmetrically to each other with respect to, the rotational axis C2.

The protruding end of each of the hooks 8*a* has a flat shape corresponding to that of an associated flat surface 12*b* of the contact tip 12.

Inserting the contact tip 12 into the driven rotator 8 from over the rotator 8 will make the respective protruding ends of the hooks 8*a* face their associated flat surfaces 12*b* and will get the respective protruding portions 12*c* of the contact tip 12 hooked on the respective hooks 8*a*. This brings the center axis of the contact tip 12 into alignment with the rotational axis C2.

The bottom end of each driven rotator 8 has a pair of downwardly protruding engageable projections 8*b*, which are arranged symmetrically to each other with respect to the rotational axis C2 as shown in FIGS. 4 and 6.

Each of the engageable projections 8*b* has an engageable face 8*d* extending along the rotational axis of the associated driven rotator 8. The engageable face 8*d* covers the protruding end through base end of the engageable projection 8*b*.

The protruding end facet of one engageable projection 8*b* spirally runs with tilt from an edge portion of the engageable face 8*d*, which is located closer to the protruding end of the engageable projection 8*b*, in the normal rotation direction of the driven rotator 8 (i.e., in the direction Y1), and is connected to an edge portion of the engageable face 8*d* at the base end of the other engageable projection 8*b*.

The protruding end facet of the other engageable projection 8*b* spirally runs with tilt from an edge portion of the engageable face 8*d*, which is located closer to the protruding end of the engageable projection 8*b*, in the normal rotation direction of the driven rotator 8 (i.e., in the direction Y1), and is connected to an edge portion of the engageable face 8*d* at the base end of the one engageable projection 8*b*.

A second coil spring 8*c* (serving as an exemplary second spring member) is wound around each driven rotator 8.

One end of the second coil spring 8*c* is secured to the outer peripheral surface of the upper portion of the driven rotator 8. On the other hand, the other end of the second coil spring 8*c* abuts on the annular projecting portion 72. Thus, the second coil spring 8*c* biases the driven rotator 8 upward (i.e., in the one direction along the rotational axis of the drive rotator 45).

A disk cover 49, of which the center axis is aligned with the rotational axis C3, is secured to the top end of the shaft case 48. The disk cover 49 has a central insertion hole 49*a*, into which the contact tip 12 is insertable.

Above the disk cover 49, arranged is a guide bar 44 extending obliquely upward from the disk cover 49 toward the rotational axis C1. At the extension end of the guide bar 44, provided is a guide ring portion 44*a*, of which the center axis is aligned with the rotational axis C1.

The guide ring portion 44*a* corresponds in shape to the torch body 10*a*. Inserting the torch body 10*a* into the guide ring portion 44*a* from over the portion 44*a* will bring the center axis of the torch body 10*a* into alignment with the rotational axis C1.

The torch body 10*a* is inserted into the guide ring portion 44*a* from over it to press the contact tip 12 that has already been inserted into the driven rotator 8 with the torch body 10*a*. Then, the driven rotator 8 will move downward (i.e., in the other direction along the rotational axis of the drive rotator 45) and come into contact with the drive rotator 45 against the biasing force of the second coil spring 8*c*.

Furthermore, rotating the drive rotator 45 in the normal rotation direction with the driven rotator 8 kept in contact with the drive rotator 45 will bring each engaging face 45*b* into engagement with its associated engageable face 8*d*, thus allowing the drive rotator 45 and the driven rotator 8 to rotate integrally with each other. This rotary movement makes the contact tip 12 turn on its center axis and gets the contact tip 12 attached to the tip end of the torch body 10*a*.

At one longitudinal end of the gearbox 4, a pair of vertically extending slide bars 9*a* are provided so as to be spaced from each other by a predetermined interval horizontally, i.e., in a direction intersecting with the longitudinal direction of the gearbox 4, as shown in FIGS. 7-11.

Between these two slide bars 9*a*, arranged is a generally thick-plate-shaped sliding member 9, which is gently curved so as to match the shape of an outer peripheral edge of the rotary unit 7. A pair of slide holes 9*b* vertically penetrating the sliding member 9 are provided at positions corresponding to the respective slide bars 9*a*.

These slide holes 9*b* are externally fitted onto their associated slide bars 9*a*. The sliding member 9 bridges the two slide bars 9*a* together and is slidable vertically (i.e., along the rotational axis of the drive rotator 45) on those slide bars 9*a*.

The sliding member 9 includes a first wall portion 9*e* and a second wall portion 9*f*, both of which protrude and face toward the rotary unit 7. The second wall portion 9*f* is arranged downstream of the first wall portion 9*e* in the normal rotation direction of the rotary unit 7 and is spaced apart from the first wall portion 9*e* by a distance shorter than the interval between each pair of first projections 73.

The first wall portion 9*e* is provided along the bottom edge of the sliding member 9 to cover approximately an upstream half of the sliding member 9 in the normal rotation direction of the rotary unit 7. The thickness of the first wall portion 9*e* as measured in its protruding direction is less than the protrusion height of the second projection 74.

The second wall portion 9*f* is provided at the downstream end of the sliding member 9 in the normal rotation direction of the rotary unit 7 so as to cover a portion of the sliding member 9 from the top end through a middle thereof. The first and second wall portions 9*e* and 9*f* are vertically arranged one over the other as viewed in the normal rotation direction of the rotary unit 7.

A vertically extending, elongate press bar 9*c* is attached to the center of the top of the sliding member 9 so as to form an integral part of the sliding member 9.

Under the sliding member 9, on the other hand, arranged is a fourth coil spring 9*d*, which biases the sliding member 9 upward (i.e., in the one direction along the rotational axis of the drive rotator 45).

Figure 7:
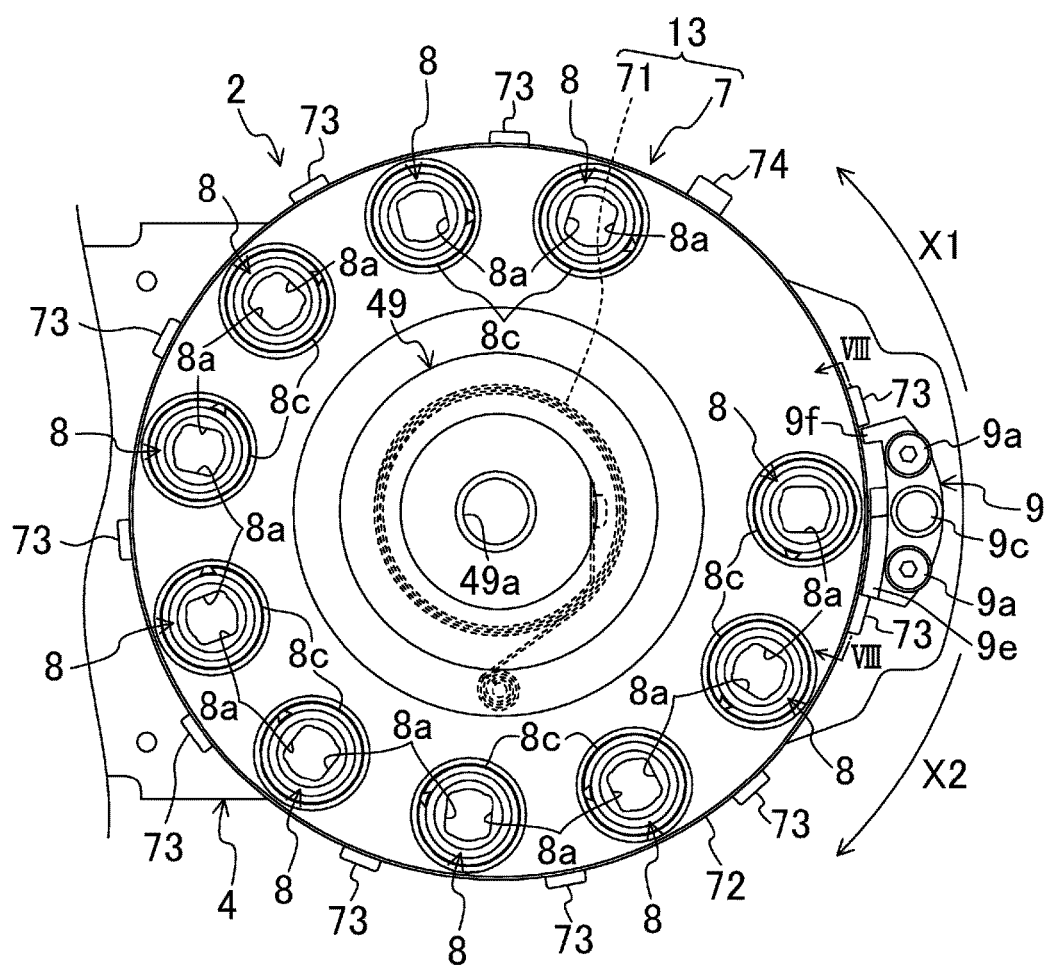
FIG. 7 is a top view of the rotary unit of the rotary changer according to the first embodiment of the present disclosure.
Figure 8:
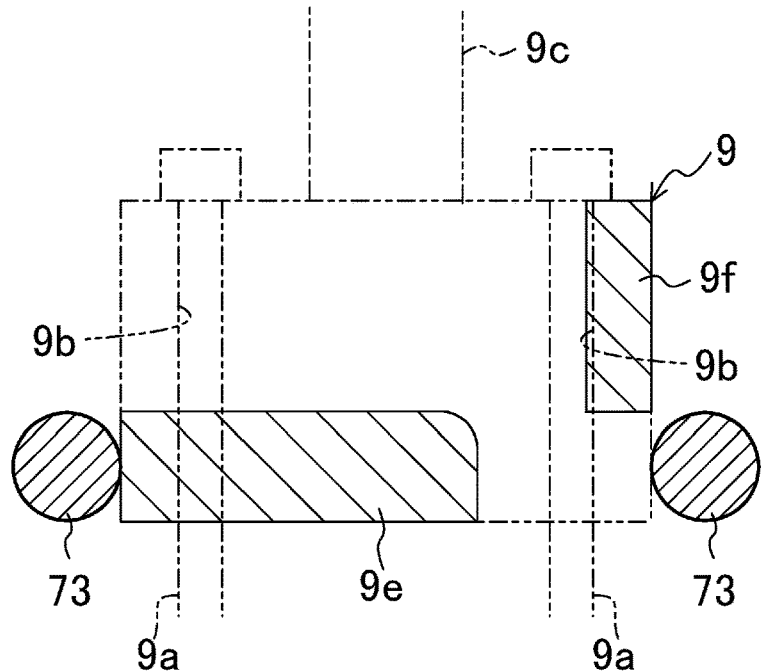
FIG. 8 is a cross-sectional view taken along the plane VIII-VIII shown in FIG. 7.

The first wall portion 9*e* is configured to block the passage of each of the first projections 73 during the normal direction rotation of the rotary unit 7 and come into contact with one of the first projections 73 as shown in FIGS. 7 and 8 as the sliding member 9 slides upward. This brings the rotational axis C2 of the driven rotator 8, performing the contact tip 12 attaching work, into alignment with the rotational axis C1.

Figure 9:
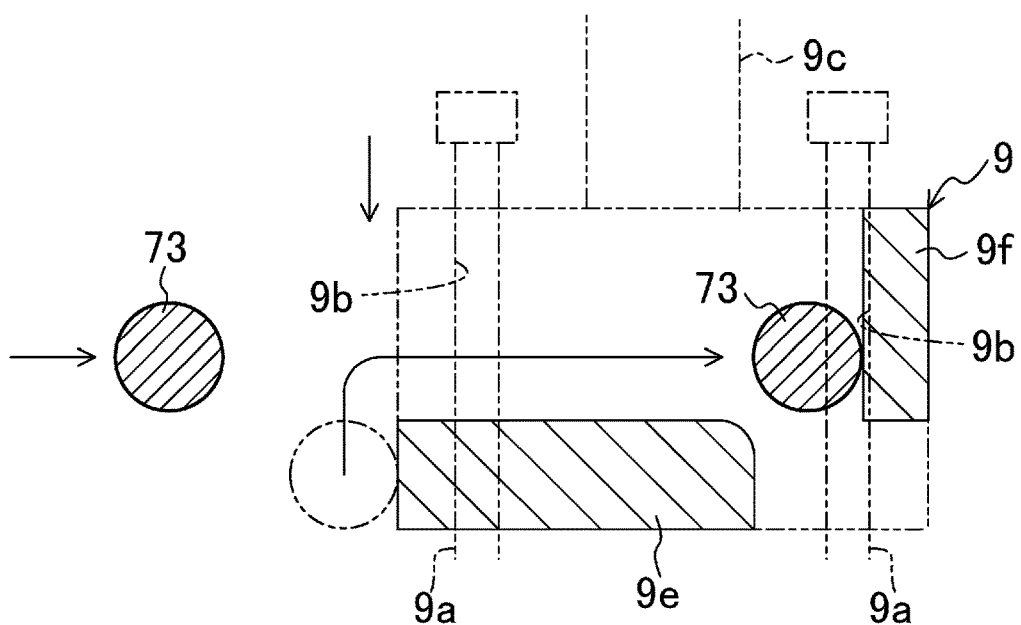
FIG. 9 illustrates a state after the one shown in FIG. 8 and just before the next contact tip is ready to be attached as a result of the rotation of the rotary unit.

Also, the first wall portion 9*e* is configured to clear a passage for each of the first projections 73 during the normal direction rotation of the rotary unit 7 as shown in FIG. 9 as the sliding member 9 slides downward.

On the other hand, the second wall portion 9*f* is configured to block the passage of each of the first projections 73 during the normal direction rotation of the rotary unit 7 and come into contact with one of the first projections 73 as the sliding member 9 slides downward, thereby bringing the rotation of the rotary unit 7 to a halt.

Figure 11:
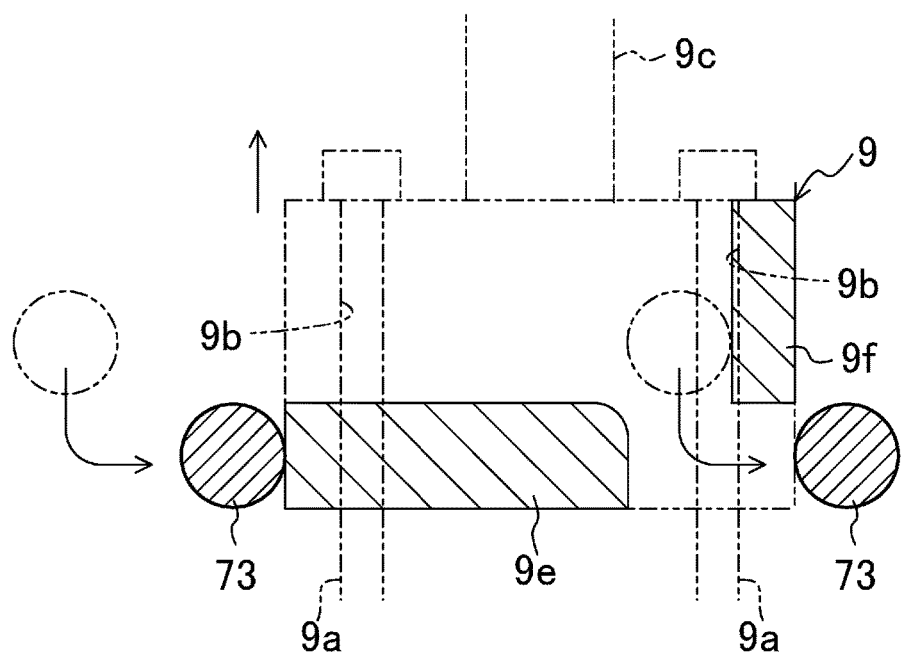
FIG. 11 is a cross-sectional view taken along the plane XI-XI shown in FIG. 10.

Also, the second wall portion 9*f* is configured to clear a passage for each of the first projections 73 during the normal direction rotation of the rotary unit 7 as shown in FIG. 11 as the sliding member 9 slides upward, thus allowing the rotary unit 7 to start rotating under the biasing force of the power spring 71.

The opening/closing cover 6 has one longitudinal end portion thereof pivotally supported by the cover case 5 so as to be pivotally movable up and down as shown in FIGS. 1 and 2. At the other longitudinal end of the opening/closing cover 6, arranged side by side are two insertion holes 6*a* and 6*b* which respectively face the guide ring portion 44*a* and the press bar 9*c* when the opening/closing cover 6 is closed.

Next, the attaching work of attaching the contact tip 12 to the torch body 10*a* will be described.

First, the worker opens the opening/closing cover 6 of the rotary changer 1 as shown in FIG. 2. Next, as shown in FIG. 7, he or she winds the power spring 71 by rotating the rotary unit 7 in the reverse rotation direction (i.e., in the direction X2) against the biasing force of the power spring 71. Thereafter, he or she gets his or her hands off when the driven rotator 8 located most downstream in the normal rotation direction of the rotary unit 7 faces the sliding member 9. Then, as shown in FIG. 8, another first projection 73 next to the first projection 73 located most downstream in the normal rotation direction of the rotary unit 7 comes into contact with the first wall portion 9*e* of the sliding member 9 to bring the rotation of the rotary unit 7 to a halt. At this point in time, the rotational axis C2 of the driven rotator 8 located most downstream in the normal rotation direction of the rotary unit 7 is aligned with the rotational axis C1. Then, he or she inserts the contact tip 12 into one of the driven rotators 8 from over the rotator 8.

Next, the worker closes the opening/closing cover 6, and then has the nozzle attaching/removing mechanism 2C and the contact tip removing mechanism 2B remove the nozzle 11 and the contact tip 12, respectively, from the torch body 10a by operating an industrial robot (not shown) or any other autonomous machine.

Subsequently, the worker inserts the torch body 10a into the insertion hole 6a of the opening/closing cover 6 from over the hole 6a. Then, the torch body 10a is guided by the guide ring portion 44a and comes into contact with the contact tip 12 that has already been inserted into the driven rotator 8 as shown in FIG. 5.

As the torch body 10a is moved further downward, the driven rotator 8 will slide downward against the biasing force of the second coil spring 8c to come into contact with the drive rotator 45. At this point in time, the impact produced when the driven rotator 8 comes into contact with the drive rotator 45 is absorbed by the contraction of the first coil spring 47, thus substantially preventing the drive rotator 45 and the driven rotator 8 from being damaged or deformed.

Thereafter, the servomotor 41 is started with the driven rotator 8 and the drive rotator 45 kept in contact with each other, thereby driving the drive rotator 45 in rotation in the normal rotation direction via the pinion gear 41b, the first gear 42, and the second gear 43. Then, as shown in FIG. 6, each engaging projection 45a is allowed to move while making a sliding contact with the driven rotator 8 and each engageable projection 8b is allowed to move while making a sliding contact with the drive rotator 45, thus bringing the engaging face 45b of each engaging projection 45a into engagement with the engageable face 8d of an associated engageable projection 8b. This makes the drive rotator 45 and the driven rotator 8 rotate integrally with each other.

As the drive rotator 45 rotates, each engageable projection 8b moves spirally while making a sliding contact with the protruding end facet of an associated engaging projection 45a. Meanwhile, each engaging projection 45a moves spirally while making a sliding contact with the protruding end facet of an associated engageable projection 8b. Thereafter, the engaging face 45b of each engaging projection 45a gets engaged with the engageable face 8d of an associated engageable projection 8b. This reduces the variation in frictional resistance produced between the drive rotator 45 and the driven rotator 8 before the engaging projection 45a and the engageable projection 8b get engaged with each other, thus allowing the drive rotator 45 to be smoothly connected to the driven rotator 8.

Then, as the driven rotator 8 rotates, the contact tip 12 turns on its center axis to be screwed on and attached to the tip end of the torch body 10a.

After the contact tip 12 attaching work has been done, the torch body 10a is moved upward to have the driven rotator 8 stop pressing the drive rotator 45 downward. Then, the drive rotator 45 slides upward under the biasing force of the first coil spring 47 and the driven rotator 8 slides upward under the biasing force of the second coil spring 8c. Thus, the drive rotator 45 and the driven rotator 8 automatically go back to their original positions. This enhances the work efficiency of the contact tip 12 replacement using the first and second coil springs 47 and 8c and without entailing additional costs.

While the drive rotator 45 and the driven rotator 8 are going back to their original positions, each engaging projection 45 and its associated engageable projection 8b go out of engagement with each other while the engaging face 45b and the engageable face 8d are making a sliding contact with each other. Thus, no load is imposed on the drive rotator 45 or the driven rotator 8 while the drive rotator 45 and the driven rotator 8 are going out of contact with each other. As can be seen, no heavy load is imposed on the engaging projection 45a or the engageable projection 8b when the drive and driven rotators 45 and 8 are being connected together or disconnected from each other. Consequently, almost no deformation or damage will be done to either of the drive and driven rotators 45 and 8 that are performing the contact tip 12 replacement.

Thereafter, the contact tip 12 attached to the tip end of the torch body 10a is inserted into the insertion hole 6b of the opening/closing cover 6. Then, the contact tip 12 presses the press bar 9c downward, thus allowing the sliding member 9 to slide downward against the biasing force of the fourth coil spring 9d.

Sliding the sliding member 9 downward will bring the first projection 73 that has been in contact with the first wall portion 9e out of contact with the first wall portion 9e, thus triggering the rotation of the rotary unit 7 in the unit rotation direction as shown in FIG. 9. Meanwhile, the first projection 73 that has gone out of contact with the first wall portion 9e will come into contact with the second wall portion 9f when it has moved a shorter distance than the interval between the first projections 73, which will bring the rotation of the rotary unit 7 to a halt again.

Figure 10:
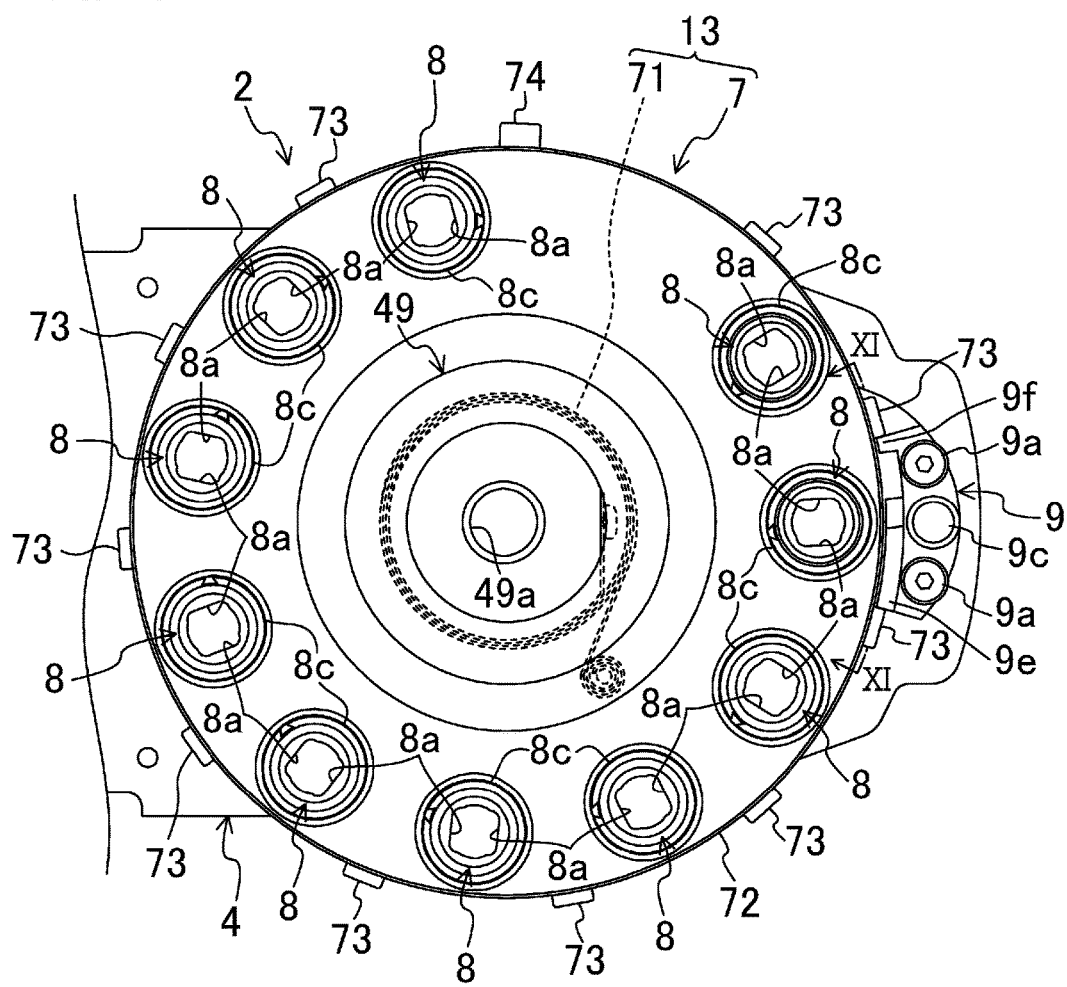
FIG. 10 illustrates a state after the one shown in FIG. 9 and just after the next contact tip has become attachable as a result of the rotation of the rotary unit and corresponds to FIG. 7.

Next, the torch body 10a is moved upward to make the contact tip 12 attached to the torch body 10a stop pressing the press bar 9c. Then, as shown in FIGS. 10 and 11, the sliding member 9 automatically slides upward under the biasing force of the fourth coil spring 9d.

Sliding the sliding member 9 upward will bring the first projection 73 that has been in contact with the second wall portion 9f out of contact with the second wall portion 9f, thus allowing the rotary unit 7 to start rotating under the biasing force of the power spring 71. Meanwhile, another first projection 73 adjacent to the first projection 73 that has gone out of contact with the second wall portion 9f comes into contact with the first wall portion 9e, which brings the rotation of the rotary unit 7 to a halt again. At this time, another driven rotator 8, adjacent to the driven rotator 8 that has performed the contact tip 12 attachment work, has its rotational axis C2 aligned with the rotational axis C1 of the drive rotator 45 to make the next contact tip 12 attachment work ready to start. In this manner, the respective driven rotators 8 that perform the contact tip 12 attachment work are changeable with the biasing force of the power spring 71 and the reciprocation of the sliding member 9. Thus, this rotary changer 1 can have a simpler configuration, and be less expensive, than a changer requiring a power supply or an air supply source.

In addition, the sliding member 9 is allowed to automatically slide upward under the biasing force of the fourth coil spring 9d. Thus, the driven rotators 8 are changeable just by pressing the sliding member 9 downward. Consequently, the driven rotators 8 are changeable efficiently using the fourth coil spring 9d and without entailing additional costs.

By repeatedly performing this series of operations a number of times, the rotary changer 1 can perform the work of attaching the contact tip 12 onto the tip end of the torch body 10a ten times.

Note that when the driven rotator 8 located most upstream in the rotation direction of the rotary unit 7 reaches a position where the driven rotator 8 faces the sliding member 9, the second projection 74 comes into contact with the first wall portion 9e, thus bringing the rotation of the rotary unit 7 to a halt. Then, even if the sliding member 9 is allowed to slide downward after the contact tip 12 inserted into the driven rotator 8 has been attached, the second projection 74 always abuts on a lateral edge portion of the sliding member 9 to keep the rotary unit 7 from rotating any further in the normal rotation direction. This is because the protrusion height of the second projection 74 is greater than the thickness of the first wall portion 9e as measured in its protruding direction.

In the first embodiment of the present disclosure described above, each of the first projections 73 is supposed to be located at a position on the outer peripheral edge of the rotary unit 7 where the first projection 73 faces the gap between an associated pair of driven rotators 8. However, it should be appreciated that this is only a non-limiting exemplary embodiment. Alternatively, each of the first projections 73 may also be located at a position on the outer peripheral edge of the rotary unit 7 where the first projection 73 faces an associated one of the driven rotators 8.

In the first embodiment of the present disclosure described above, turning the contact tip 12 on its center axis in the direction Y1 with the driven rotator 8 allows the contact tip 12 to be attached to the tip end of the torch body 10a. Alternatively, the rotary changer may also be configured to make the drive rotator 45 rotate the driven rotator 8 in the direction Y2 and to remove the contact tip 12 from the tip end of the torch body 10a by inserting the contact tip 12 attached to the torch body 10a into the driven rotator 8 and allowing the contact tip 12 to turn on its center axis in the direction Y2.

<<Second Embodiment of the Present Disclosure>>

Figure 12:
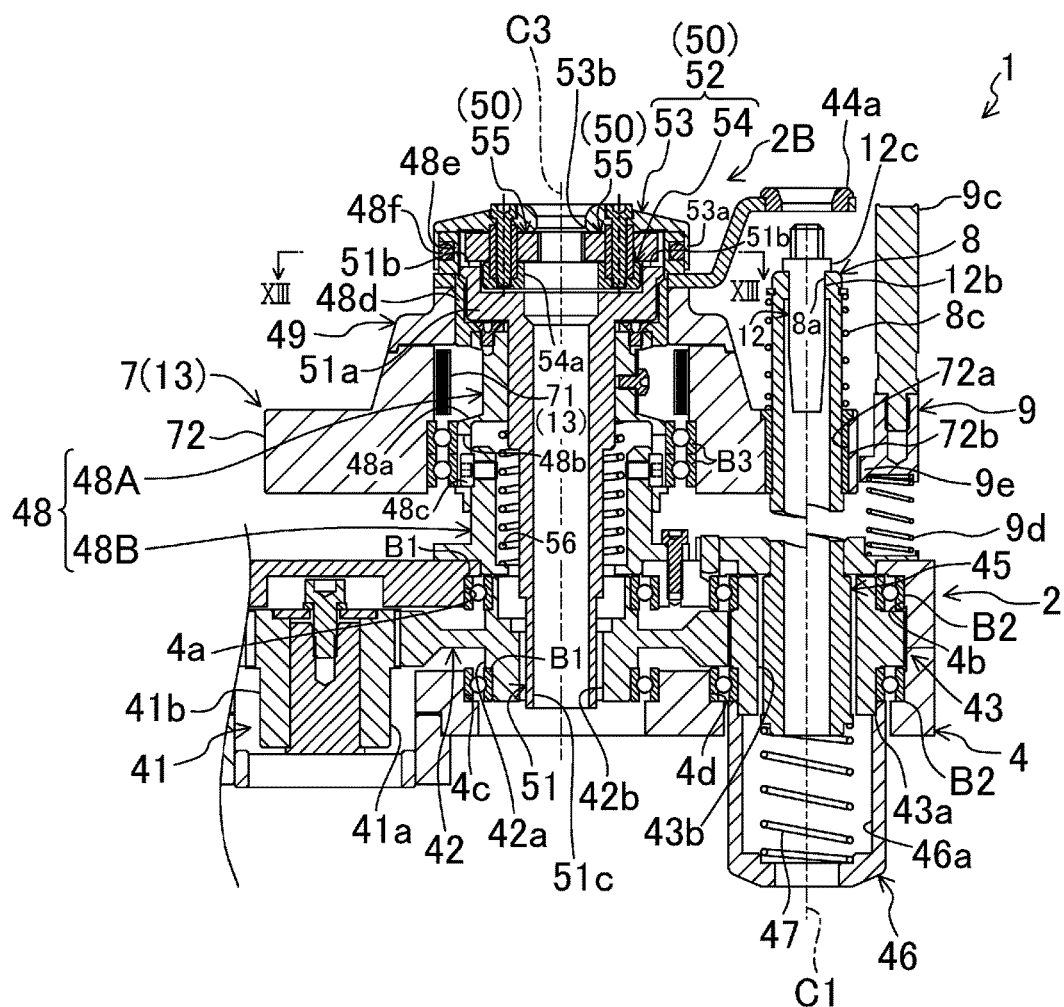
FIG. 12 illustrates a second embodiment of the present disclosure and corresponds to FIG. 3.
Figure 13:
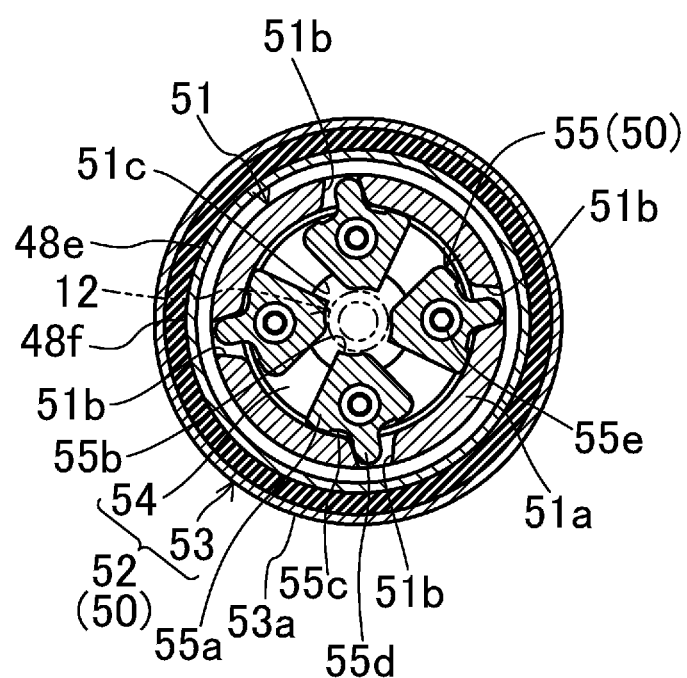
FIG. 13 is a cross-sectional view taken along the plane XIII-XIII shown in FIG. 12.
Figure 14:
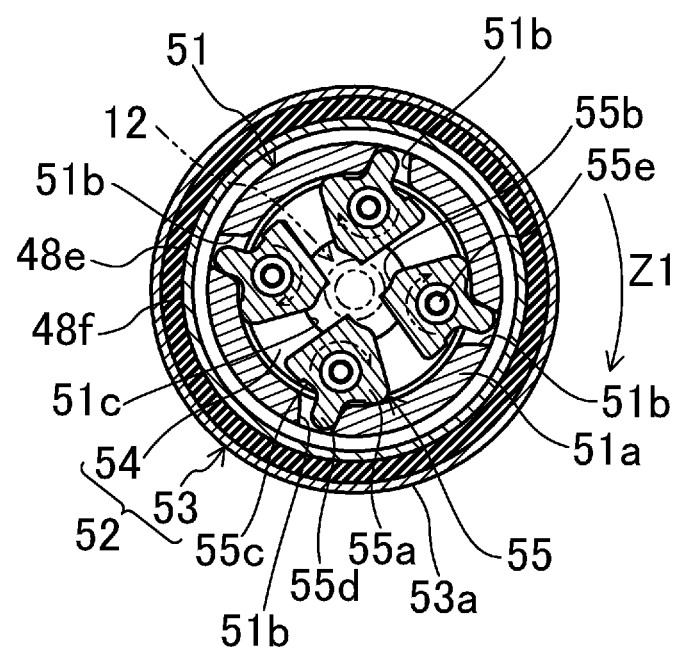
FIG. 14 illustrates a state after the one shown in FIG. 13 and just after the contact tip has started to be removed from the tip end of the torch body.

FIGS. 12-14 illustrate a rotary changer 1 according to a second embodiment of the present disclosure. The second embodiment is the same as the first embodiment described above except the structure of the contact tip removing mechanism 2B. Thus, the following description of the second embodiment will be focused on only differences from the first embodiment.

A cylindrical member 51, of which the center of cylinder is aligned with the rotational axis C3, is inserted into the first center hole 42b of the first gear 42 so as to be vertically slidable. A vertically penetrating tip passage hole 51c is cut as an inner hole through the cylindrical member 51.

The cylindrical member 51 is configured to rotate, along with the first gear 42, on the rotational axis C3 via a key groove (not shown). Turning the pinion gear 41b with the servomotor 41 will trigger rotation of the cylindrical member 51 on the rotational axis C3 via the first gear 42.

The cylindrical member 51 has, on the outer peripheral edge of a top portion thereof, an annular wall portion 51a protruding laterally outward and extending upward. The upper half of the annular wall portion 51a has four radially extending groove portions 51b, which are open at both ends and arranged at regular intervals around the rotational axis C3.

An annular body 52, which is rotatable on the rotational axis C3 with its centerline aligned with the rotational axis C3, is provided inside the annular wall portion 51a.

The annular body 52 is comprised of: a generally disklike cover plate 43 forming the upper part thereof; and a ring member 54 arranged under the cover plate 53 with a predetermined gap left between them. The cover plate 53 covers the opening at the top of the annular wall portion 51a.

The ring member 54 is located inside the lower half of the annular wall portion 51a and has a hole 54a at its center.

The cover plate 53 has, on its outer peripheral edge, an annular extension 53a protruding downward and extending annularly along the outer peripheral edge of the cover plate 53. The cover plate 53 also has, at its center, a tip insertion hole 53b communicating with the upper opening of the hole 54a.

Inside the upper half of the annular wall portion 51a, four press claws 55, having a generally arrow shape in a plan view, are arranged at regular intervals around the rotational axis C3. Each of these press claws 55 is arranged to face an associated one of the groove portions 51b.

Each of the press claws 55 includes a generally fan-shaped claw body portion 55a, of which the width gradually decreases toward the rotational axis C3 in a plan view. One end facet of the claw body portion 55a closer to the rotational axis C3 is a gently curved face 55b, which is depressed radially outward.

On the other hand, the other end facet of each press claw 55 more distant from the rotational axis C3 has a level difference face portion 55c, of which a center portion is slightly depressed with respect to both end portions thereof. At the center of the level difference face portion 55c, a projection 55d to loosely fit into an associated one of the groove portions 51b is provided so as to protrude laterally outward.

The respective press claws 55 and the annular body 52 together form a clamping tool 50. The press claws 55 are pivotally supported by the cover plate 53 and the ring member 54 with vertically extending screws 55e, and are pivotally movable toward the rotational axis C3.

In the second embodiment, the shaft case 48 includes a cylindrical upper shaft case portion 48A forming an upper part thereof, and a cylindrical lower shaft case portion 48B forming a lower part thereof.

The upper half of the upper shaft case portion 48A makes a slidable contact with the outer peripheral surface of the cylindrical member 51. The lower half of the upper shaft case portion 48A forms an annular step portion 48a, of which the diameter is increased stepwise laterally outward.

The upper shaft case portion 48A is externally fitted onto the lower shaft case portion 48B with its cylinder centerline aligned with that of the lower shaft case portion 48B such that the annular step portion 48a is vertically slidable on the upper half of the lower shaft case portion 48B.

The annular step portion 48a has a plurality of vertically extending slits 48b around its cylinder centerline.

On the other hand, a plurality of pins 48c to fit into the respective slits 48b are attached to the upper part of the outer peripheral surface of the lower shaft case portion 48B to have the respective slits 48b guide the respective pins 48c as the upper shaft case portion 48A slides vertically.

The upper part of the upper shaft case portion 48A has an annular projection 48d protruding laterally outward and projecting upward. The annular projection 48d covers the outer side surface of the annular wall portion 51a of the cylindrical member 51.

The outer peripheral surface of the upper part of the annular projection 48d has an annular fitting recess 48e, in which an O-ring 48f is fitted.

The annular projection 48d is located inside the annular extension 53a of the cover plate 53 such that the outer peripheral edge of the O-ring 48f contacts with the inner peripheral surface of the annular extension 53a.

Meanwhile, the disk cover 49 of the second embodiment has a ring shape and externally fits onto the outer peripheral surface of the lower part of the annular projection 48d.

A fifth coil spring 56 is arranged inside the lower shaft case portion 48B and externally fitted onto the cylindrical member 51.

The bottom end of the fifth coil spring 56 is secured to the peripheral edge of the bottom of the lower shaft case portion 48B. On the other hand, the top end of the fifth coil spring 56 is secured to a middle of the upper shaft case portion 48A. Thus, the fifth coil spring 56 biases the cylindrical member 51 upward via the upper shaft case portion 48A.

Then, the cylindrical member 51 is allowed to rotate in the normal rotation direction (i.e., in the direction Z1 shown in FIG. 14) on the rotational axis C3 with the contact tip 12 inserted through the tip insertion hole 53b into the tip passage hole 51c. This relative normal direction rotation of the cylindrical member 51 with respect to the clamping tool 50 makes the inner surface of each grove portion 51b press its associated projection 55d in the normal rotation direction. This allows each of the press claws 55 to pivotally move forward toward the rotational axis C3, thereby pressing the outer peripheral surface of the contact tip 12 and clamping the contact tip 12.

Furthermore, with the press claws 55 pressing the contact tip 12, further rotating the cylindrical member 51 in the normal rotation direction allows the contact tip 12 to turn along with the clamping tool 50 and thereby be removed from the torch body 10a.

In this case, the contact tip 12 has been screwed on, and coupled to, the torch body 10a. Thus, as the contact tip 12 is downwardly screwed off the torch body 10a with respect to the torch body 10a by the normal direction rotation of the cylindrical member 51, the cylindrical member 51 will be gradually disengaged from the torch body 10a against the biasing force of the fifth coil spring 56. This substantially prevents screwing the contact tip 12 during the removal work of the contact tip 12 from putting a heavy load onto either the cylindrical member 51 or the torch body 10a to cause deformation or damage to the cylindrical member 51 or the torch body 10a.

On the other hand, rotating the cylindrical member 51 in the reverse rotation direction with respect to the clamping tool 50 will allow the inner surface of each groove portion 51b to press an associated one of the projections 55d in the reverse rotation direction. Then, each of the press claws 55 pivotally moves backward in the direction away from the rotational axis C3 to go out of contact with the outer peripheral surface of the contact tip 12. In this manner, the press claws 55 are disengaged from the contact tip 12. Thus, the contact tip 12 is allowed to drop through the tip passage hole 51c and be disposed of.

As can be seen from the foregoing description, according to the second embodiment of the present disclosure, rotating the cylindrical member 51 to remove the contact tip 12 from the torch body 10a will increase the pressure of the press claws 55 on the contact tip 12, thus allowing the clamping tool 50 to grip the contact tip 12 firmly. Therefore, no slip will occur between the clamping tool 50 and the contact tip 12 during the removal work, which greatly facilitates the removal of the contact tip 12. In addition, the contact tip 12 may be clamped by taking advantage of the rotary movement of the cylindrical member 51 during the removal of the contact tip 12. This eliminates the need to clamp the contact tip 12 by separately providing an additional drive source other than the drive source for driving the cylindrical member 51 in rotation. Consequently, a rotary changer 1 with a simplified configuration and a smaller size is provided at a reduced cost.

The present disclosure is useful for a rotary changer configured to replace a contact tip screwed on, and coupled to, a tip end of the torch body of a welding torch for use in arc welding.

What is claimed is:

1. A rotary changer configured to attach or remove a contact tip to/from a tip end of a torch body of a welding torch by turning the contact tip on its center axis, the rotary changer comprising:
   a first rotator to be driven in rotation on a first rotational axis;
   a plurality of second rotators provided to be rotatable on a second rotational axis that extends in the same direction as the first rotational axis and arranged side by side perpendicularly to the second rotational axis in order to turn the contact tip with the center axis of the contact tip aligned with the second rotational axis;
   a moving mechanism configured to move one of the second rotators after another to sequentially bring the second rotational axis of each of the second rotators into alignment with the first rotational axis at a position in one of two directions along the rotational axis of the first rotator; and
   a first spring member configured to bias the first rotator in the one direction along the rotational axis of the first rotator, wherein
   the first rotator has an engaging projection with an engaging face extending along the rotational axis of the first rotator,
   each said second rotator has an engageable projection with an engageable face extending along the rotational axis of the second rotator, and
   rotating the first rotator with the second rotator, of which the second rotational axis is aligned with the first rotational axis, moved toward the first rotator brings the engaging face into engagement with the engageable face.

2. The rotary changer of claim 1, wherein:
   the engaging face covers a protruding end through a base end of the engaging projection, and
   a protruding end facet of the engaging projection spirally runs with tilt from an edge portion of the engaging face, which is located closer to the protruding end of the engaging projection, in a reverse rotation direction of the first rotator.

3. The rotary changer of claim 1, further comprising:
   a second spring member configured to bias the second rotator in a direction away from the first rotator along the rotational axis of the second rotator.

4. The rotary changer of claim 3, wherein:
   the engaging face covers a protruding end through a base end of the engaging projection, and
   a protruding end facet of the engaging projection spirally runs with tilt from an edge portion of the engaging face, which is located closer to the protruding end of the engaging projection, in a reverse rotation direction of the first rotator.

5. The rotary changer of claim 1, wherein:
   the moving mechanism includes:
   a third rotator which is provided to be rotatable on a third rotational axis that extends parallel to the first rotational axis and on which the second rotators are arranged side by side at regular intervals in a rotation direction around the third rotational axis; and
   a third spring member configured to bias the third rotator in a normal rotation direction of the third rotator, the third rotator has, at an outer peripheral edge thereof, a plurality of projections that are arranged at regular intervals in the rotation direction around the third rotational axis so as to face either the respective second rotators or gaps between the respective second rotators, a sliding member which is slidable along the rotational axis of the first rotator is provided radially outside the third rotator, and the sliding member includes a first wall portion and a second wall portion, the first wall portion blocking passage of the respective projections during the normal direction rotation of the third rotator and bringing the second rotational axis of the second rotator that is replacing the contact tip into alignment with the first rotational axis, when the sliding member is allowed to slide in the one direction along the rotational axis of the first rotator, the first wall portion clearing a passage for the respective projections during the normal direction rotation of the third rotator when the sliding member is allowed to slide in the other of the two directions along the rotational axis of the first rotator, the second wall portion being provided downstream of the first wall portion in the normal rotation direction of the third rotator and located away from the first wall portion at a distance shorter than the interval between the respective projections, the second wall portion clearing a passage for the respective projections during the normal direction rotation of the third rotator when the sliding member is allowed to slide in the one direction along the rotational axis of the first rotator, the second wall portion blocking the passage of the respective projections during the normal direction rotation of the third rotator when the sliding member is allowed to slide in the other direction along the rotational axis of the first rotator.

6. The rotary changer of claim 5, further comprising:

a fourth spring member configured to bias the sliding member in the one direction along the rotational axis of the first rotator.

* * * * *